United States Patent Office 3,451,501
Patented June 24, 1969

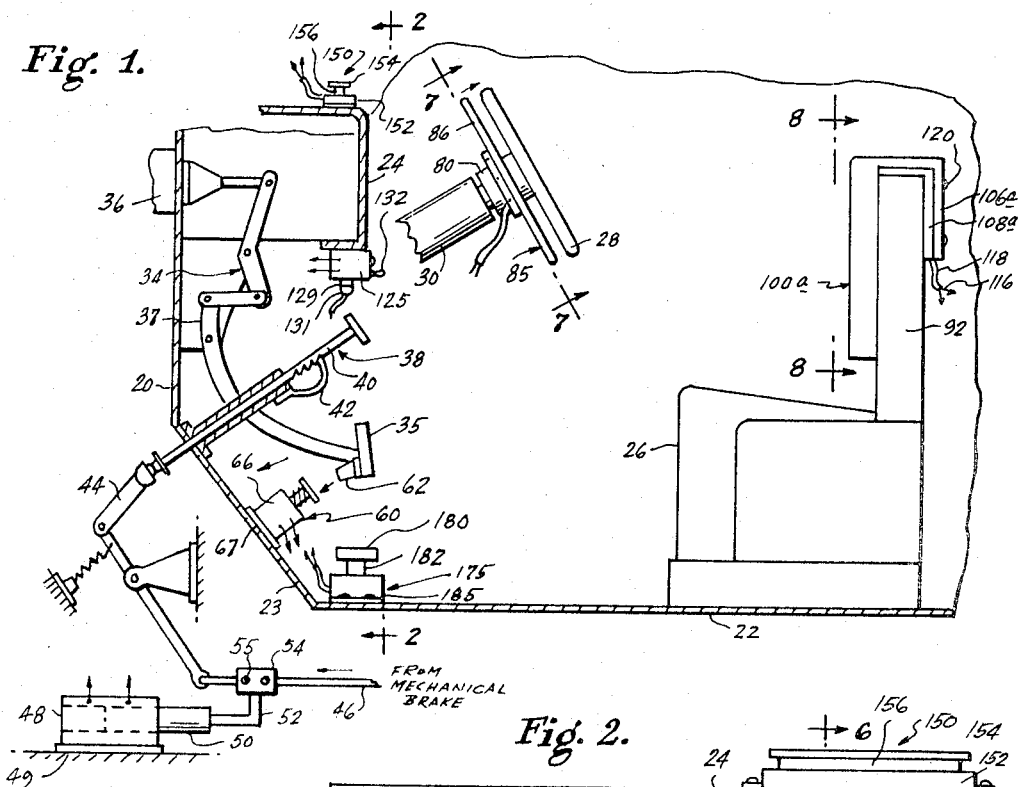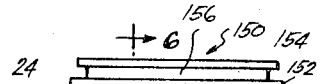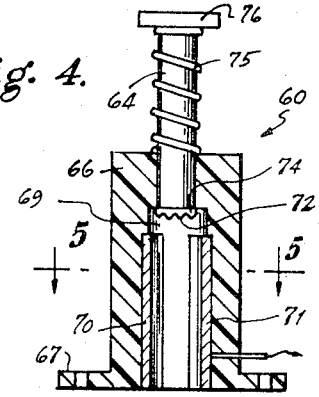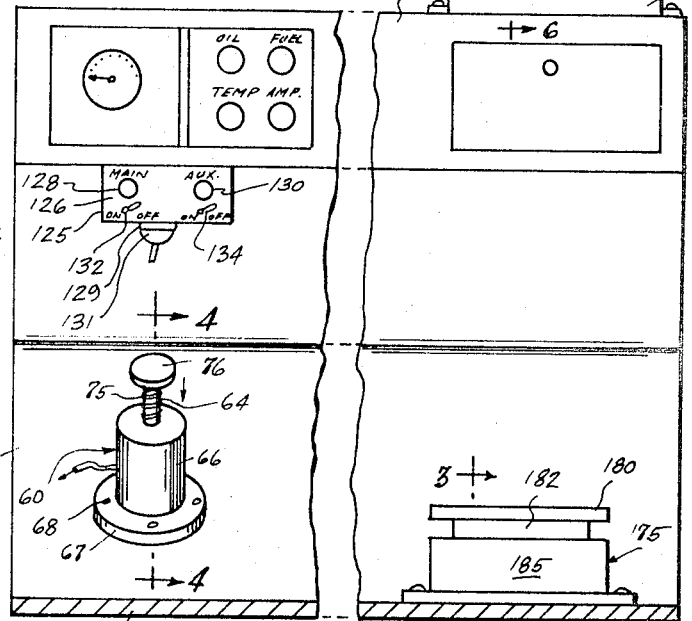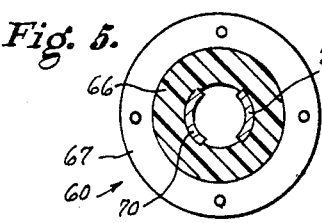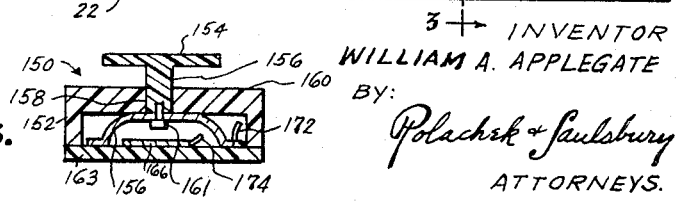

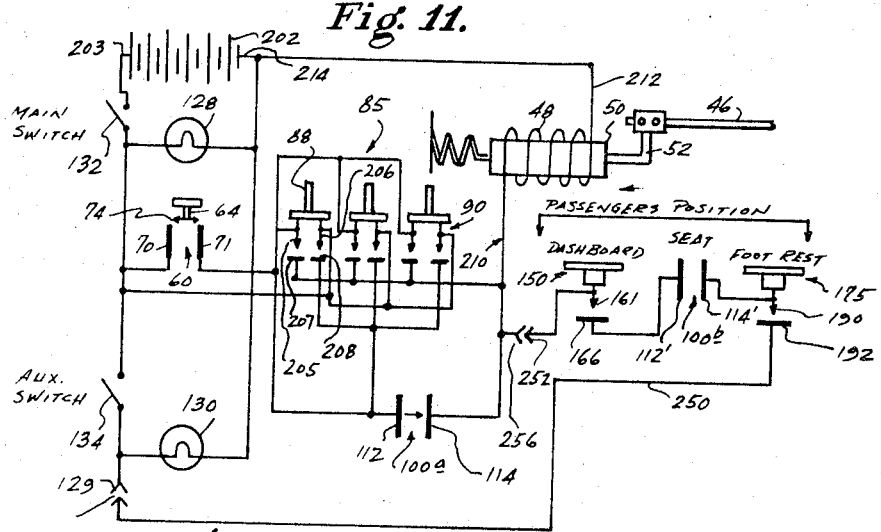
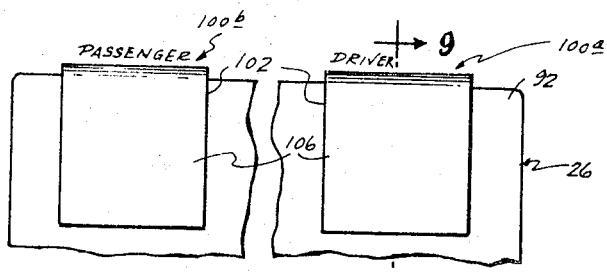
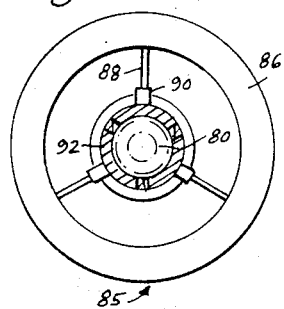
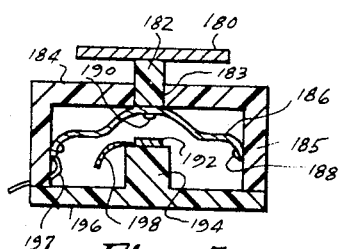

3,451,501
AUTOMATIC EMERGENCY BRAKE
ACTUATION SYSTEM
William A. Applegate, 2001 NW. 36th St.,
Fort Lauderdale, Fla. 33309
Filed Oct. 14, 1968, Ser. No. 767,244
Int. Cl. B60t 7/14; F16d 65/14; B60k 27/08
U.S. Cl. 180—99                                                  10 Claims

ABSTRACT OF THE DISCLOSURE

An automatic emergency brake actuation system includes a plurality of switch assemblies located at the seat, steering wheel and service brake pedal of an automotive vehicle. The assemblies include switches connected in circuit with an electromagnetically operated solenoid arranged to operate the emergency brake of the vehicle. Simultaneous closure of any two of the switches operates the emergency brake. The system may also include switch means for actuating the emergency brake in the event that the service brakes fail. The system may also include switch means for actuating the emergency brake by a passenger in the vehicle in the event the driver fails to respond to an emergency situation.

---

It has been proposed heretofore to provide an automotive vehicle with means for actuating the emergency or mechanical brake of the vehicle in the event that the hydraulic service brakes fail. Such braking systems are described in U.S. Patents 1,476,398; 2,302,436 and 3,333,902. In the event that the hydraulic service brakes remain operable, the emergency hand brake must be operated manually in the event of an imminent collision or other emergency.

The present invention is directed at improvements in prior automatic emergency brake actuation systems to provide that a mechanical emergency hand brake will be operated automatically to supplement the braking provided by the hydraulic service brakes.

A principal object of the invention is to provide a braking system which takes advantage of reflex muscular actions of a driver to operate an emergency brake.

A further object is to provide an emergency braking system which operates automatically only in the event of an emergency which also cannot be operated inadvertently or accidentally.

A further object is to provide an automatic emergency braking system which operates a mechanical brake in the event of failure of the hydraulic service brakes.

A further object is to provide an automatically operated emergency brake which is actuated electromagnetically.

A further object is to provide an emergency braking system operable by a passenger of a vehicle.

A further object is to provide braking means which can be installed in vehicles having conventional hand and service brakes to convert the same to an automatically operated emergency braking system.

According to the present invention, switch assemblies are provided at the driver's seat, steering wheel and service brake pedal of an automotive vehicle. These assemblies include switches connected in an electrical circuit with an electromagnetically operated solenoid arranged to actuate the mechanical emergency brake. The switches are so interconnected that at least two of the switches must be closed simultaneously for the emergency brake to be actuated automatically. A further switch is provided to operate the solenoid in the event that the hydraulic service brakes fail so that the emergency brake can be actuated independently of the other switches or in conjunction therewith. An auxiliary assembly of dashboard, seat and pedal switches can be provided in circuit with the solenoid for automatic operation of the emergency brake by a passenger in the event that the driver of the vehicle becomes disabled or fails to respond to an emergency situation.

For further comprehension of the invention and of the objects and advantages thereof, reference will be had to the following description and accompanying drawings and to the appended claims in which the various novel features of the invention are more particularly set forth.

In the accompanying drawings, forming a material part of this disclosure:

FIGURE 1 is a fragmentary vertical sectional view, partially diagrammatic in form of a vehicle, portions being omitted or broken away, showing parts of a braking system embodying the invention.

FIG. 2 is a fragmentary vertical sectional view partially diagrammatic in form taken on line 2—2 of FIG. 1.

FIG 3 is a vertical sectional view on an enlarged scale taken through on line 3—3 of FIG. 2, through a foot operated switch.

FIG. 4 is a vertical sectional view on an enlarged scale taken on line 4—4 of FIG. 2, through a switch operated by a brake pedal.

FIG. 5 is a cross sectional view taken on line 5—5 of FIG. 4.

FIG. 6 is a vertical sectional view on an enlarged scale taken on line 6—6 of FIG. 2, through a hand operated switch.

FIG. 7 is a cross sectional view taken on line 7—7 through a steering wheel switch assembly.

FIG. 8 is a fragmentary elevational view of a seat back and seat switch assemblies taken on line 8—8 of FIG. 1.

FIG. 9 is a vertical sectional view of a seat switch assembly taken on line 9—9 of FIG. 8.

FIG. 10 is a vertical sectional view taken on line 10—10 of FIG. 9.

FIG. 11 is an electrical diagram of the braking system embodying the invention.

Referring first to FIGS. 1 and 2, there are shown parts of an automotive vehicle V having a front fire-wall 20, floor 22, inclined floor board 23, dashboard 24 front seat 26, steering wheel 28 and steering column 30. Hydraulic foot brake assembly 34 includes a brake pedal 35 operatively connected via a linkage 37 to master brake cylinder 36. Hand brake assembly 38 includes a rotatable hand operated lever 40 engaged by a ratchet 42 and operatively connected via linkage 44 to mechanical brake rod 46. Rod 46 terminates at a mechanical brake (not shown). To the extent described, the parts of the vehicle described are conventional.

Now according to the invention, a solenoid 48 is mounted in a stationary position on a suitable support 49. The solenoid has a movable armature or plunger 50. This plunger moves inwardly of the solenoid when the solenoid is energized. Connected to the plunger is a link 52 which terminates in a coupling 54 secured by screws 55 to the brake rod 46 to retract this rod. The solenoid is connected in a circuit described in detail below in connection with FIG. 11.

On the inclined floor board 23 adjacent to the brake pedal 35 is switch assembly 60 operated by bar 62 attached to the brake pedal. Switch assembly 60 as best shown in FIGS. 1, 2 and 4 and 5, has a shaft 64 movable axially in a casing 66 made of insulation material. The casing has a bottom flange 67 held by screws 68 to the floor board. Inside cylindrical cavity 69 in the casing are two cylindrically curved stationary electrical contacts 70 and 71 spaced diametrally apart. The contacts 70 and 71 are contacted by spring fingers 72 of a conductive ring 74 carried by shaft 64 when the shaft is pushed inwardly of the casing 66. A coil spring 75 is engaged on a shaft 64 between the top of the casing and annular flange 76 at the top of the shaft. The switch assembly 60 is located so that bar 62 will depress shaft 64 against tension in spring 75 when the foot brake pedal 35 is depressed. It will be noted that the axial length of contacts 70 is longer than the normal length of travel of brake pedal 35. Normally when the foot brake assembly 34 is operated, the shaft 64 will be pushed down only about half way so that ring 74 bridges both contacts 70, 71. If the hydraulic brake system of assembly 34 should fail, then shaft 64 will be pushed in further but ring 74 will still bridge contacts 70, 71. The purpose of this arrangement is described below in connection with the circuit of FIG. 11.

Attached to hub 80 of steering wheel 28 is a switch assembly 85 shown best in FIGS. 1 and 7. Switch assembly 85 includes a ring 86 connected by radial arms 88 to three switches 90 mounted on ring 92 coupled by set screws 93 to hub 80. The ring 86 is concentric with steering wheel 28 and is slightly spaced underneath it. Both ring 86 and steering wheel 28 can be grasped at the same time. When the ring 86 is pressed upwardly toward the steering wheel at any one or more points arms 88 operate any one or more of the three switches 90. The switches are described below in further detail in connection with the circuit of FIG. 11.

Mounted on the back 92 of seat 26 are two similar seat switch assemblies 100a and 100b best shown in FIGS. 1, 8, 9 and 10. Since both switch assemblies are identical, only one need be described in detail. Assembly 100a is located at the driver's seat position and switch assembly 100b is located at a passenger's seat position. Each seat switch assembly has a generally rectangular cloth or plastic casing 102. Inside the casing is a rectangular array of coil springs 104 axially disposed between front and rear walls 106, 108. An inner cloth or plastic wall 110 holds the coil springs in place. On the inner side of front wall 106 and on the inner opposing side of rear wall 108 are two thin, flexible electrically conductive sheets or plates 112, 114. The plates are normally spaced apart by the expanded springs. When the driver or passenger lean back forcefully, the plates 112, 114 contact each other at any one or more points. The plates are connected via wires 116 in the electrical circuit of FIG. 11. The wires are disposed in a cable 118 which extends through juxtaposed panels 106a and 108a which are extensions of walls 106, 108 of casing 102. The panels 106a, 108a are draped over the back 92 of seat 26 and may be secured by screws 120 to hold the switch assemblies in place. The seat switch assemblies serve as resilient back rests in addition to performing switching functions described below in connection with FIG. 11.

Mounted under the dashboard 24 at the driver's position is a control box 125. This control box has a front panel 126 best shown in FIG. 2. On this panel are two pilot lamps 128 and 130 designated respectively MAIN and AUXILIARY. Two ON-OFF switches 132, 134 are associated with the respective pilot lamps. At the bottom of box 125 is a socket 129 engaging a plug 131. The lamps, switches, socket and plug are connected in the circuit of FIG. 11 described below.

On dashboard 24 at the passenger's position is a manually operable switch assembly 150. This switch assembly as best shown in FIGS. 1, 2 and 6 includes a casing 152 secured to the top of the dashboard. A horizontal plate 154 is secured to a vertical bar 156 movably mounted in opening 158 in the top 160 of the casing 152. A bowed leaf spring 162 is secured by a pin 161 in the bottom of bar 156. The spring bears on base plate 163 and holds the bar in elevated position. The electrical contact pin 161 is spaced above a fixed electrical contact 166 mounted on base plate 163 of the assembly. Wires 172 and 174 extend from spring 162 and contact 166 and are connected in the electrical circuit of FIG. 11.

On the floor 22 at the passenger's position is secured a foot operated switch assembly 175. This switch assembly as best shown in FIGS. 1, 2 and 3 has a horizontal plate 180 secured to a vertical bar 182 movably mounted in opening 183 in the top 184 of casing 185. A bowed leaf spring 186 is secured by pins 188 to side walls of the casing. A contact pin 190 secures the bottom end of bar 182 to the center of spring 186. Spring 186 holds the bar 182 in elevated position. Contact pin 190 is spaced above a fixed contact 192 mounted on a post 194 extending upwardly from base plate 196. Wires 197 and 198 extend from spring 186 and contact 192 and are connected in the electrical circuit of FIG. 11.

It will be apparent that the driver's position there are three switch assemblies; 60, 85 and 100a. Also at the passenger's position there are three switch assemblies; 100b, 150 and 175. All these switch assemblies are connected in electric circuit 200 of FIG. 11 to which reference is now made.

Electric circuit 200 includes a battery 202 which may be the battery conventionally provided in an automotive vehicle. Connected to terminal 203 of the battery is a main switch 132 which is closed for activating the entire circuit and open to deactivate the circuit. The switch assembly 60 operated by the hydraulic brake pedal includes the two spaced contacts 70, 71, which are bridged by ring contact 74 when the shaft 64 is depressed. Steering wheel switch assembly 85 includes three sets of double-pole switches 90 each operated by one of the arms 88. Each switch has two poles 205, 206, and two stationary contacts 207, 208. Corresponding poles and contacts are connected together in parallel in the three switches. The seat switch assembly 100a has two plates or sheets 112, 114 which contact against spring bias when the driver leans back forcefully.

Contact 70 of assembly 60 and poles 206 of assembly 85 are connected to terminal 203 of the battery via switch 132. Contact 71 is connected to poles 205. Contacts 207 are connected to terminal 210 of solenoid 48. The other terminal 212 of the solenoid is connected to terminal 214 of the battery. Contact 71 of assembly 60 is also connected to plate 112 of switch assembly 100a. Plate 114 is connected to terminal 210 of the solenoid. Contacts 208 are connected to plate 112. Pilot lamp 128 is connected across the battery and switch 132 so this lamp lights only when switch 132 is closed to indicate activation of circuit 200.

Auxiliary switch 134 is connected to switch 132 and terminal 203. Pilot lamp 130 is connected across the battery and switch 134 to light only when switch 134 is closed.

Auxiliary circuit 250 is provided as an option if the vehicle is to be equipped with switch assemblies operated by passenger of a vehicle independently of any action by the driver. The auxiliary circuit includes the dashboard switch assembly 150, seat switch assembly 100b and foot rest switch assembly 175 connected in series. In order to provide quick attachment or detachment of the auxiliary circuit, there are provided two plugs 131 and 252 which engage in sockets 129 and 256 respectively. Socket 129 is connected to switch 134. Plug 131 is connected to switch contact 192 of switch assembly 175. Switch contact 190 is connected to plate 114' of seat switch assembly 100b. Plate 112' is connected to contact 166 of switch assembly 150. Contact 161 is connected to plug 252. Socket 256 is connected to terminal 210 of the solenoid 48.

In operation of the main section of circuit 200, it will be apparent that actuation and closure of any two of the switch assemblies 60, 85 and 100a will cause the solenoid 48 to become energized so that the plunger 50 will retract link 52 to retract brake rod 46 and operate the emergency mechanical brake of the vehicle. Under normal driving conditions a driver is in relaxed position. In the event of an emergency condition suddenly occurring such as an imminent collision, the natural reflex action of the driver includes gripping the steering wheel tightly, bracing his back firmly against the back of the driver's seat and pressing down hard on the brake pedal. It has been noted by a study of many vehicular accidents that drivers react as described above and generally neglect to operate the emergency brake under the stress of the emergency. The circuit 200 however, will operate to actuate the emergency mechanical brake automatically since closure by the driver of any two switch assemblies simultaneously will actuate solenoid 48 to operate the emergency brake.

If the hydraulic brake system should fail at any time, then when the brake pedal is depressed the circuit is conditioned for operation. If the driver will at that time also grip the steering wheel and switch ring 86 tightly, or brace his back firmly against the seat switch assembly 100a the emergency brake will be operated automatically. It will be noted that each time the brake pedal 35 is pushed down as far as it will go the automatic emergency brake operating system is conditioned for operation but will not operate unless the driver also grips the steering wheel and switch ring 86 together or braces his back against seat switch assembly 100a with sufficient force to close the power supply circuit to solenoid 48. The system is so arranged that manual operation of the emergency brake can be done at any time independently of the automatically operated system.

If the seat switch assembly 100b, foot rest switch assembly 185 and dashboard assembly 150 are provided and arranged as shown in the drawings, a passenger can operate the emergency brake under emergency conditions. The auxiliary circuit 250 cannot be operated accidentally. The passenger must raise at least one arm to close the dashboard switch assembly 150. He must brace his back forcefully against seat back 92 to close seat switch assembly 100b. He must raise one leg and place his foot on the switch assembly 175 to operate this assembly. Furthermore, he must perform at all three of these actions simultaneously to actuate the three series connected switch assemblies 100b, 150 and 175 and to apply power to solenoid 48. While the driver can operate the automatic emergency brake operation system by performing any two of the three specified actions, the passenger must perform all three specified actions simultaneously. This arrangement positively insures that a passenger will not accidentally operate the emergency brake by one or two accidental movements. He must perform all three specified movements and they must be done simultaneously. Of course if desired, the three switch assemblies 100a, 150 and 175 could be arranged in a manner similar to switch assemblies 60, 85 and 100a so that actuation of any two of the passenger's switch assemblies will not result in operation of the emergency brake.

The auxiliary circuit 250 is optional as explained above, but under certain conditions, such as in student driver training for example, it may be highly desirable or even necessary to provide a passenger sitting alongside the driver with facilities to stop the vehicle in the event of an emergency to which the driver may not respond quickly enough.

The entire system described can be installed in an existing vehicle as accessory equipment, or it can be installed in a vehicle as original equipment.

What is claimed is:

1. An automaticalyy operated emergency braking system for an automotive vehicle having a driver's seat, steering wheel and hydraulic brake pedal all located at a driver's position, and having a mechanical emergency brake including an operating linkage; said system comprising in combination; a first switch assembly mountable adjacent the steering wheel and operable by the driver's manually gripping both said wheel and an operating part of said switch assembly to actuate the same; a second switch assembly mountable adjacent said brake pedal and operable thereby when the brake pedal is pushed down as far as it will go; a third switch assembly mountable on said seat and operable when the driver leans back forcefully to actuate the third switch assembly; solenoid means arranged for coupling to said linkage for operating the emergency brake when the solenoid is energized; power supply means; and electrical circuitry interconnecting the three switch assemblies, said power supply and said solenoid means, so that operation of any two of said three switch assemblies by the driver simultaneously will apply power to said solenoid for operating the emergency brake.

2. An automatically operated emergency braking system as defined by claim 1, wherein the vehicle also has a dashboard, floor and passenger's seat and wherein the system further comprises a fourth switch assembly mountable on the dashboard and operable when a passenger manually actuates the fourth switch assembly; a fifth switch assembly mountable on the floor of the vehicle and operable when the passenger presses a foot against the fifth switch assembly; a sixth switch assembly mountable on the passenger's seat and operable when the passenger leans back forcefully to actuate the sixth switch assembly; and further circuitry interconnecting the fourth, fifth and sixth switch assemblies, said power supply and said solenoid means, whereby operation of the fourth, fifth and sixth switch assemblies simultaneously will apply power to said solenoid means to operate the emergency brake of the vehicle.

3. An automatically operated emergency braking system as defined by claim 1, wherein the first switch assembly comprises a ring mountable on the hub of the steering wheel, a second ring disposed concentric with and adjacent to the steering wheel, a plurality of circumferentially spaced normally open switches carried by the first ring, and a plurality of radial arms connecting the second ring and said switches respectively, whereby at least one of the switches is closed when the second ring is moved closer to the steering wheel at any point.

4. An automatically operated emergency braking system as defined by claim 1, wherein the second switch assembly comprises a casing, a pair of spaced long contacts in said casing, and a bridging contact movable by the hydraulic brake pedal to bridge the long contacts, the length of said long contacts being longer than the normal distance of travel of said brake pedal so that in the event the hydraulic brake system of the vehicle fails, said bridging contact will still bridge the long contacts as the brake pedal travels a distance longer than its normal distance.

5. An automatically operated emergency braking system as defined by claim 1, wherein the third switch assembly comprises a casing, a multiplicity of spaced axially parallel coil springs in casing, a pair of electrically conductive plates in said casing normally spaced apart when the springs are expanded, and means for mounting the casing on the back of the driver's seat, so that the conductive plates contact each other while the springs are compressed when the driver leans back forcefully against said casing for operating the third switch assembly.

6. An automatically operated emergency braking system as defined by claim 1, wherein each of the fourth and fifth switch assemblies includes a casing, a fixed contact mounted in the casing, a movable contact in the casing, a movable bar carrying said movable contact and extending into the casing from the exterior thereof, and spring means biasing the bar outwardly of the casing, whereby pressing said bar inwardly of the casing of either one of the fourth and fifth switch assemblies operates said one switch assembly.

7. An automatically operated emergency braking system as defined by claim 2, wherein said sixth switch assembly comprises a casing, a multiplicity of spaced axially parallel springs in said casing, a pair of electrically conductive plates in said casing normally spaced apart when the springs are expanded, and means for mounting the casing on the back of the passenger's seat, so that the conductive plates contact each other while the springs are compressed when the passenger leans back forcefully against said casing for operating the sixth switch assembly.

8. An automatically operated emergency braking system as defined by claim 1, further comprising a manually operable switch connected in said circuitry for selectively activating and deactivating all the switch assemblies.

9. An automatically operated emergency braking system as defined by claim 8 further comprising a second manually operable switch connected in said further electrical circuitry for selectively activating and deactivating the fourth, fifth and sixth switch assemblies.

10. An automatically operated emergency braking system as defined by claim 9, further comprising pilot lamps connected in the first named and said further circuitry for lighting the lamps to indicate activity of the circuitry when first named and second manually operable switches are closed.

References Cited

UNITED STATES PATENTS

| | | | |
|---|---|---|---|
| 2,172,116 | 9/1939 | Warren | 180—99 X |
| 2,296,003 | 9/1942 | Van Loo | 180—99 |
| 2,873,811 | 2/1959 | Uffert et al. | 180—99 |
| 3,037,576 | 6/1962 | Bianco | 180—99 |

DUANE A. REGER, *Primary Examiner.*

U.S. Cl. X.R.

180—101; 188—106, 109, 163